Aug. 14, 1928. 1,680,473
O. PARKER
AEROPLANE LANDING AND LAUNCHING DEVICE
Filed Nov. 23, 1927  2 Sheets-Sheet 2
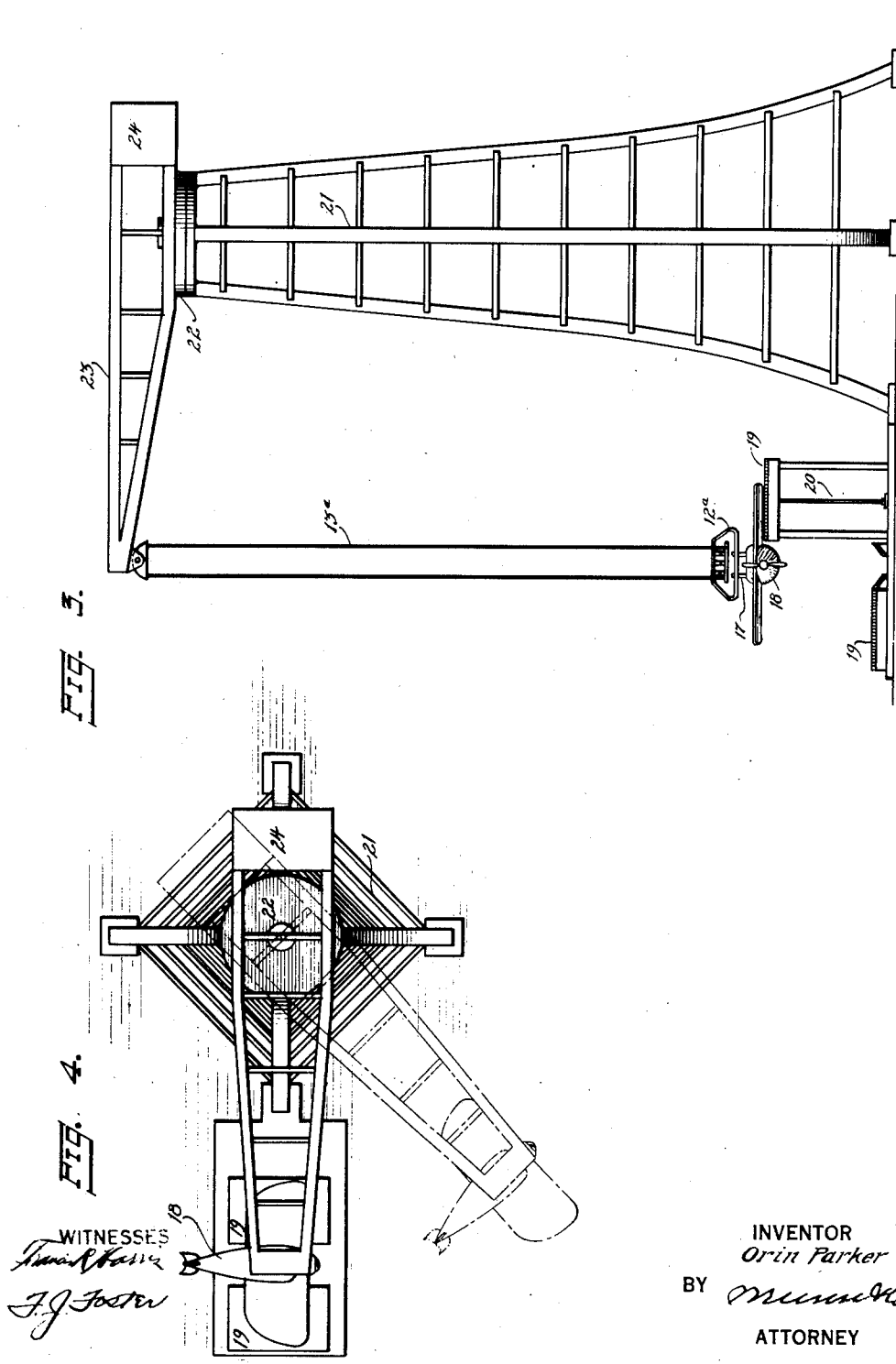
INVENTOR
Orin Parker
BY
ATTORNEY Patented Aug. 14, 1928.

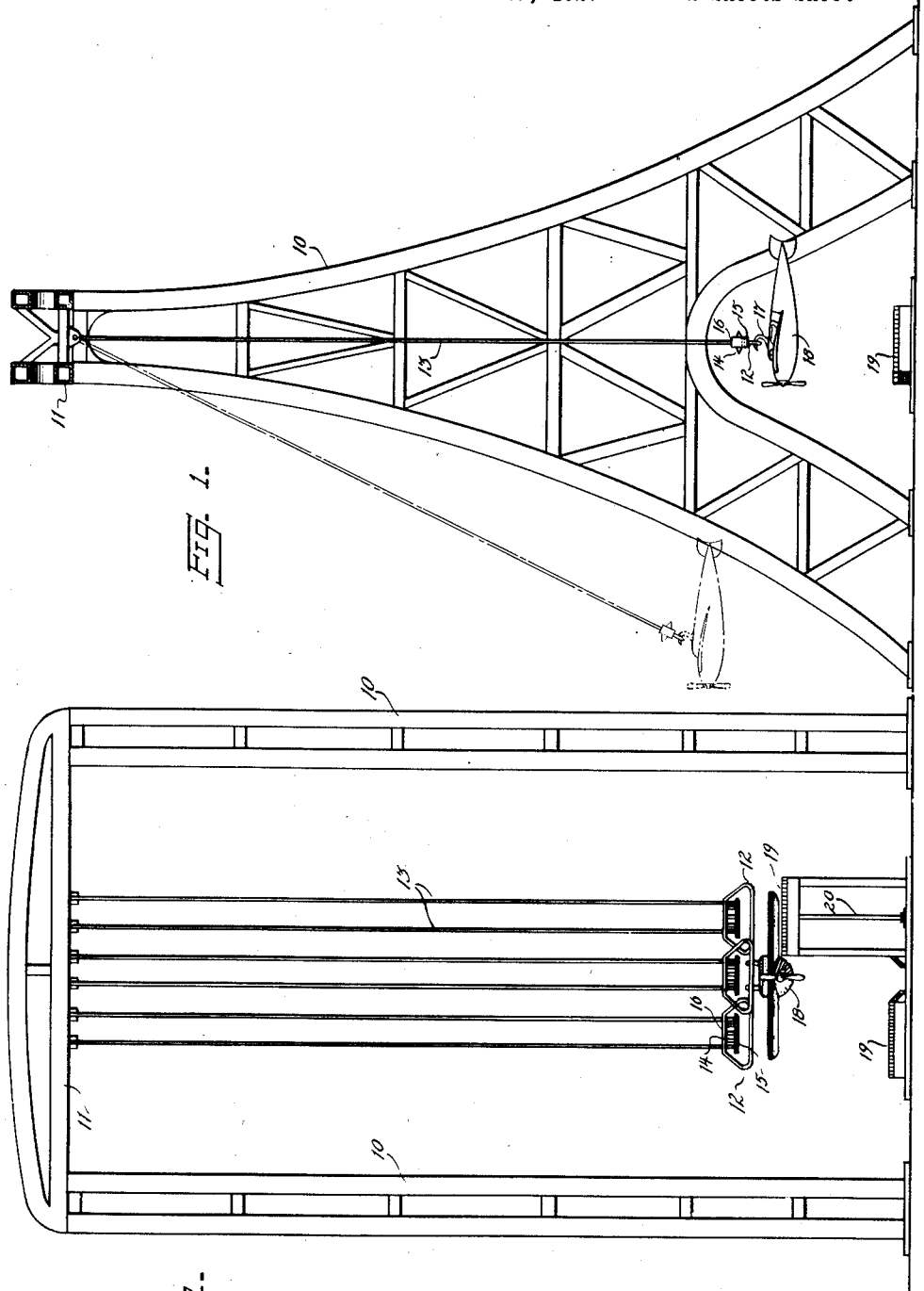

1,680,473

UNITED STATES PATENT OFFICE.

ORIN PARKER, OF BENTONVILLE, ARKANSAS.

AEROPLANE LANDING AND LAUNCHING DEVICE.

Application filed November 23, 1927. Serial No. 235,228.

The present invention is concerned with the provision of novel mechanism primarily designed for landing and launching aeroplanes in comparatively congested areas in order that the necessity for capacious landing fields may be avoided, and the planes may be landed relatively close to the centers of large cities.

The invention is by no means limited in respect to the locations in which it may be used, since it at all times represents an improvement over the methods now employed in that planes may be landed and launched without touching the ground, and consequently with much less danger of damaging a plane or injuring an operator at the take-off or the landing.

Another object of the invention is to provide a landing and launching device of this character, which will permit a plane to be brought to a stop within a comparatively short distance, and in an extremely short time.

Other objects of the invention are to provide a landing and launching gear which will be of simple, practical construction, rugged, durable and efficient in use, and which will effect a considerable economy of space, as well as eliminate the necessity for the expensive upkeep of extremely large airports and landing fields.

With the above noted and other objects in view, the invention consists in certain novel features of construction and combinations and arrangements of parts, as will be more fully hereinafter set forth and pointed out in the claim. The invention may be more fully understood from the following description in connection with the accompanying drawings, wherein—

Fig. 1 is a vertical sectional view through a launching and landing device embodying the present invention, the dotted lines indicating the position of an aeroplane which has just engaged the landing gear, and is in course of being checked by the gear.

Fig. 2 is a front elevational view of the landing gear.

Fig. 3 is a similar view showing a modified form of launching and landing apparatus.

Fig. 4 is a top plan view of Fig. 3.

Referring first to Figs. 1 and 2 of the drawings, I have shown an apparatus which consists of a pair of spaced uprights 10 of any suitable construction and any suitable height the tops of these uprights supporting a cross piece 11 from which a plurality of rings 12 are supported by flexible hanger devices 13. Preferably, each ring is mounted on two of the flexible devices, and each ring is rendered somewhat resilient by the use of bow or other springs 14 interposed between a platform 15 at the lower ends of the flexible devices 13 and the tops 16 of the rings 12.

The rings 12 which may be of any desired number are preferably arranged in overlapping position as best seen in Fig. 2, and preferably are provided with horizontal bottoms so that they may be readily engaged by hooks 17 mounted on the top of an aeroplane 18.

The hooks 17 may be of any desired size, and project far enough above the plane to clear the propeller and other mechanism. For launching purposes they are capable of instant release by the pilot.

In using this landing gear, the pilot of a plane steers it between the two forward posts 10, and at such a level that the hooks 17 engage with one or more of the rings 12. Preferably, as soon as the plane has hooked on to the landing gear, it is steeply banked and brought to a relatively abrupt stop due to the banking action and the restraining action of the flexible devices 13. As a rapidly moving plane engages the rings as seen in Fig. 1, it will tend to swing upwardly approximately to the dotted line position of Fig. 1, at which points its momentum will be spent, and it will gravitationally return to the full line position of Fig. 1. The rings 12 are of course disposed well above the ground, and in order to facilitate the landing of the passengers and freight from the plane, a movable landing platform 19 of any desired type may be utilized. I have shown two of the platforms 19 raised and lowered by hydraulic plungers, 20, so that after the plane has been brought to rest, either platform may be shifted into proper position. Obviously, many other forms of movable platforms might be used, or the plane drawn to any desired position and rasied and lowered simply.

In Figs. 3 and 4 I have illustrated a slight modification in which a mast 21 provides at its top a swivel 22 for a horizontally disposed beam 23 carrying at its free end any suitable number of flexible devices 13ª and rings 12ª similar to those previously described. With this form of the invention, the plane hooking itself on the ring, will tend to travel in a circular path around the mast due to the fact that the beam 23 is free for rotation about the vertical axis of the mast, and may be rotated very easily due to the use of a counter balance 24.

When launching planes from either form of apparatus, it is merely necessary to impart a rapid swinging movement to the flexible devices 13 by any suitable mechanism (not shown), and to provide an automatic release means whereby the hooks 17 may be disengaged from the rings 12.

Obviously, various changes might be made in the general form and arrangement of the parts described without departing from the spirit or scope of the appended claims.

I claim:

An aeroplane landing mechanism including an upright, a flexible device pending therefrom and free for unimpeded swinging movement, and a ring spaced well above the ground and carried by the lower end of said flexible device, said ring adapted for engagement with hooks carried by aeroplanes while the latter are in flight, a plurality of said flexible devices being provided and the rings which they carry being arranged in overlapping relationship.

Signed at Bentonville, in the county of Benton and State of Arkansas this 18th day of November, 1927.

ORIN PARKER.